United States Patent [19]

Richardson

[11] 4,035,475

[45] July 12, 1977

[54] ISOTOPE EXCHANGE PROCESS

[75] Inventor: Reginald D. Richardson, Islington, Canada

[73] Assignee: Canadian General Electric Company Limited, Toronto, Canada

[21] Appl. No.: 486,693

[22] Filed: July 8, 1974

Related U.S. Application Data

[63] Continuation-in-part of Ser. No. 305,971, Nov. 13, 1972, abandoned, which is a continuation-in-part of Ser. No. 20,941, March 19, 1970, abandoned.

[30] Foreign Application Priority Data

Apr. 8, 1969 Canada .................. 47920

[51] Int. Cl.$^2$ .......................................... C01B 5/02
[52] U.S. Cl. ................ 423/580; 423/563; 23/260; 23/270.5 W
[58] Field of Search ......... 423/580, 563; 23/270 R, 23/270.5 W, 260

[56] References Cited

U.S. PATENT DOCUMENTS 3,685,966  8/1972  Thayer ........................ 423/580
3,690,830  9/1972  Nazzer ........................ 423/580

*Primary Examiner*—Earl C. Thomas
*Attorney, Agent, or Firm*—Beveridge, DeGrandi, Kline & Lunsford

[57] ABSTRACT

In a two or more stage isotope separation plant using hydrogen sulfide and water in hot and cold exchange zones, for the separation of deuterium (heavy water), in which one first stage portion passes isotope enriched fluid in the form of gas to a second dual temperature isotope concentration stage, the enrichment throughput of the second stage is supplemented by also passing isotope enriched liquid to the second stage. This permits enlargement of an existing plant by expansion of the first stage capacity only, and providing carry-over of enrichment to the unenlarged second stage in the form of gas and liquid.

This invention is directed to an isotope separation process, and to apparatus for carrying out the process. In particular the invention is directed to the separation of deuterium oxide from water, using a water-hydrogen sulphide counterflow arrangement.

5 Claims, 1 Drawing Figure

U.S. Patent
July 12, 1977
4,035,475
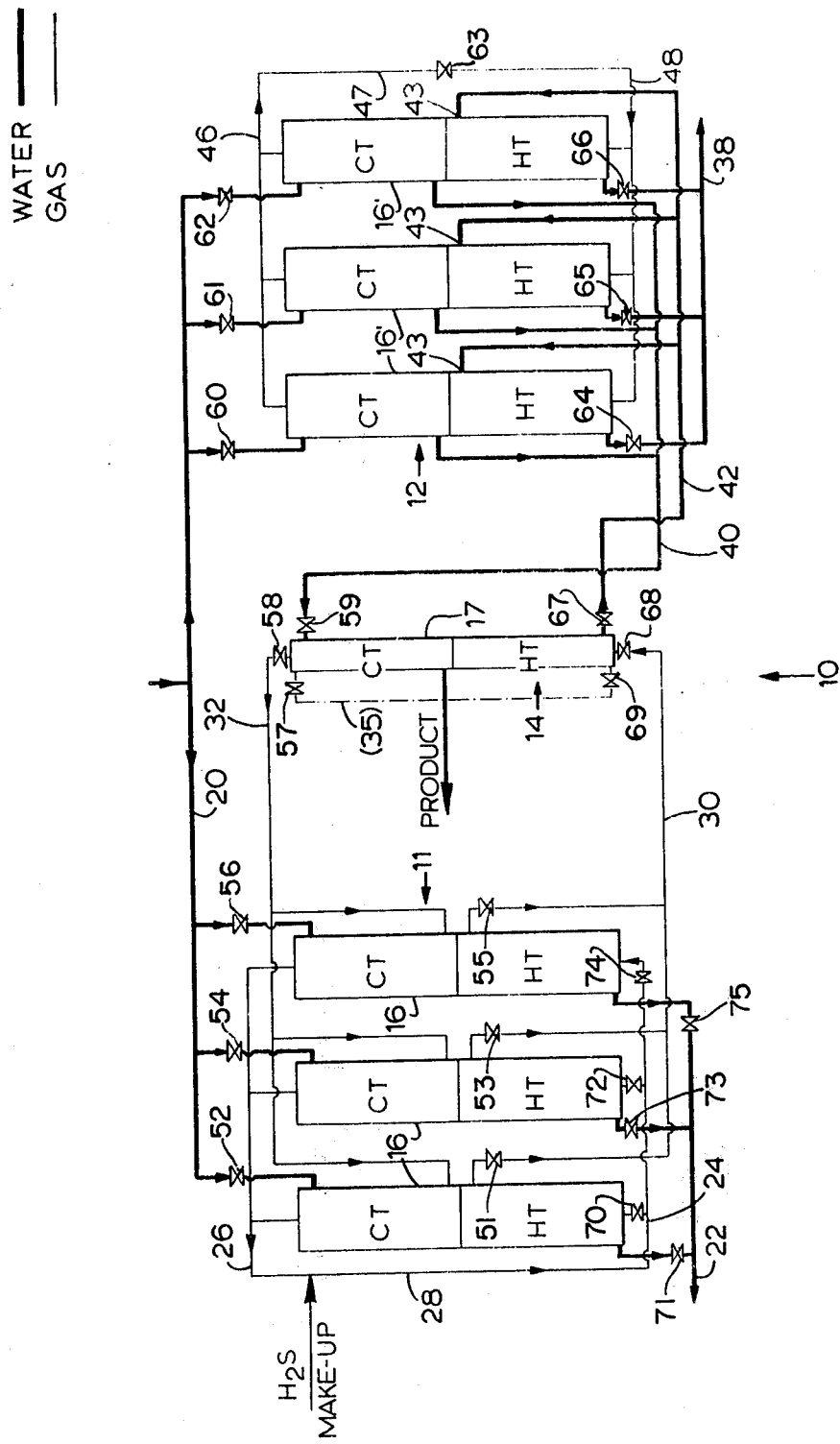

ISOTOPE EXCHANGE PROCESS

This is a continuation-in-part of application Ser. No. 305,971 filed Nov. 13, 1972, now abandoned which is a continuation-in-part of application Ser. No. 20,941 filed Mar. 19, 1970, now abandoned. In the operation of heavy water (deuterium oxide) plants, in which hydrogen sulphide gas and water are passed in counterflow isotope exchange relation through both a hot zone and a cold zone, there have been a number of suggested alternative flow arrangements. Owing to the necessity of providing zones at a marked temperature differential, and the large quantities of water and gas involved in heat exchange relation the prior flow systems have been proposed in view of their own particular advantages in structural arrangement, enrichment transfer efficiency, heat conservation, and so on.

Thus, J.S. Spevack, in his U.S. Pat. Nos. 2,787,526 issued Apr. 2, 1957 and 2,895,903 issued July 21, 1959 has proposed multiple stage enrichment cycles in which isotope enriched fluid passes from the first stage to the second stage by way of water cascade arrangement in the first instance, and by way of both water and gas cascade arrangement in the second instance.

Reference also is made to an article "Production of heavy water " by Bebbington and Thayer published in Chemical Engineering Progress Vol. 55 No. 9 Sept. 1959 relating to the Dana and Savannah River plants, in which FIGS. 9 and 10 show the transference of enrichment from one stage of the process to a succeeding stage by way of water transference.

An alternative arrangement by V. R. Thayer set forth in U.S. Pat. No. 3,411,884 of Nov. 19, 1968 shows the cascading of gas only from stage to stage. Water vapour enriched in deuterium is carried along with the hot hydrogen sulphide in the gas cascade from stage to stage. The water flow in the second and subsequent stages comprises primarily a single closed recirculation loop serving each stage independently.

This water circulation circuit for each of the stages is of sufficient capacity to provide balanced performance between the hot tower and the cold tower portions of the stage, and sufficient water is circulated enable the isotopic concentration in the water at the mid-point of the cold tower to substantially equal the isotopic concentration in the gas at the mid-point of the hot tower.

In view of the quantity of water in the form of vapour carried by the cascaded hot gas into a respective stage from the preceding stage, which water quantity is returned as a water cascade flow to the respective preceding stage, the circulation capacity of the substantially closed water circulation loop of the stage is related to a liquid quantity somewhat less than that for the circulation of total tower liquid inventory.

A plant operating in this fashion by converging deuterium enrichment from stage to stage by gaseous transfer has been operating at Port Hawkesbury, in Nova Scotia, Canada for a number of years, and the use of similar plants in other parts of Canada is commencing.

An object of the present invention is to provide an increase in capacity in a heavy water plant of this known type.

A further object of the present invention is to increase plant capacity with a minimum of disruption to continued operation of existing plant.

A further object of the present invention is to increase plant capacity at minimum expense.

A further object of the present invention is to improve the utilization of a second stage of an existing plant while increasing the productive capacity of the plant.

A further object of the present invention is to provide supplementary first stage plant capacity supplying deuterium enriched fluid in the phase opposite to that supplied in the original plant. Thus in the case of a Thayer type plant the supplementary first stage enrichment is provided as an enriched water and flow, while in the case of a Spevack plant of the type disclosed above with enriched water feed, the supplementary first stage enrichment is provided as an enriched gas flow.

The present invention provides a method of enlarging the capacity of the aforementioned Thayer type plant by the additions of further first stage capacity, without effective change in the size of the related second stage. By providing additional first stage capacity, the capacity in the plant first stage can be increased to the extent that it can be doubled, and by passing the enrichment from the added first stage section forward to the second stage in the form of a water cascade feed, in the manner taught originally by Spevack's U.S. Pat. No. 2,787,526, while at the same time continuing to pass enrichment in the form of water vapour carried by hot hydrogen sulphide from the original first stage, the quantity of enrichment entering the second stage is increased, even to the point where it is effectively doubled. However it has been postulated in accordance with the present invention, and subsequently verified theoretically that there is no need to increase the size of the second stage which would remain unchanged, as employed in the basic Thayer cascade. The water circuit is completely by the substitution of a cascade return between the existing second stage and the added first stage portion, in place of the second stage closed liquid circuit previously provided. Owing to the isotope enrichment of the water entering the second stage cold tower, in order to balance the gas to liquid enrichment factors at the respective hot and cold tower center points, the quantity of water circulating through the second stage may well be beneficially reduced.

The present invention thus provides a method of isotope enrichment in a system having a first stage passing enriched gaseous fluid in cascade arrangement to a second stage having an input capacity for deuterium enriched gas matched to the output capacity of the first stage, including the step of passing additional enrichment from a separate first stage portion to the second stage in the form of liquid flowing in cascade relation from the separate first stage portion to the second stage.

Considering the economics of a process flow arrangement utilizing a first stage having a plurality of sub-stage units in mutual parallel flow relation feeding enrichment by way of gas flow and gas humidification water vapour to a second stage, the present invention provides a capability of substantially doubling the capacity of the plant by providing additional and separate first stage units only, of equal capacity to the original first stage units, and providing a liquid cascade flow circuit between the second stage and the newly added first stage units.

The present invention thus provides in an isotope enrichment plant of the type having a plurality of stage towers forming dual temperature counter flow zones for water and hydrogen sulfide gas passing in counter flow isotope exchange relation in a plurality of stages, wherein enrichment is passed from a first stage to a subsequent stage by way of hot gas passing in cascade relation therebetween, the improvement comprising adding enrichment capacity of at least one tower added to the first stage and connected to the subsequent stage by a liquid cascade circuit to transfer enriched liquid to the subsequent stage and return depleted liquid to the added first stage, the capacity of the subsequent stage being matched initially to the gas output capacity of the original first stage towers.

It will be evident to those skilled in the art that in the case of a plant originally utilizing enrichment transfer by way of cascaded liquid as in the case of the aforementioned U.S. Pat. No. 2,787,526 that the benefits of the present invention may also be obtained by increasing the first stage capacity by the addition of at least one first stage tower unit and effecting transfer of additional enrichment by way of hot gas passing in cascade from the added portion of the first stage to the second stage.

An advantage of the present invention when practiced to expand the capacity of an existing plant is that the supplementary first stage tower capacity and associated fluid circulation circuits may be constructed while maintaining the operation of the original plant uninterrupted. After connection of the respective supplementary feed circuit to the existing second stage, the plant can then resume operation in its original mode and gradually change to the modified mode of operation, whereby plant production of heavy water is maintained at optimum capacity, with a minimum of disruption.

From theoretical and computer studies made subsequent to the date of invention on systems incorporating the invention as herein set forth, the following potential economic utility emerges.

On a basis of 1973 costs, in a 400 Tons per year heavy water plant, costing in the order of $140 Million, of the type already constructed in Canada, the addition of a doubled first stage capacity, coupled to the existing second stage unit would cost approximately 60% of the initial cost of the complete plant i.e. $84 Million approximately.

The useful output attributed to this additional capacity has been calculated to be sensibly 80% of original plant output.

Thus for an additional $84 Million plant capacity may probably be extended to 720 Tons/year.

In addition, due to incorporation of existing pumps and compressors, significant savings are effected in auxiliary capital costs and running costs, as compared with the other expedient of constructing an additional 400 Tons plant.

Also, the extension of a plant according to the present invention lends itself to operation by a single work crew, possibly enlarged somewhat, as compared to the need for a separate work crew to run a separate, additional plant.

These advantages, plus the fact that so far over the past four years or so despite the adoption of the Thayer plant arrangement, no one has seen fit to provide the particularized combination herein claimed provides certain support as to the inventive merit of the subject invention.

There follows a description of an embodiment of the present invention in which the original first stage and the added first stage each is illustrated as comprising three towers in mutual parallel flow relation, feeding to a single second stage tower. Each of the towers is illustrated as being a stack tower, as disclosed in U.S. Pat. No. 3,892,825 It will be understood that in the language of the present application a stage unit relates to a hot tower portion and a matched cold tower portion either in the form of a stacked tower or as separate towers.

Certain embodiments of the present invention are described, reference being had to the accompanying drawing which shows a schematic arrangement of an isotope enrichment plant according to the present invention.

In the drawing, the plant 10 comprises an intial first stage section 11, and a supplemental first stage 12, both feeding to a second stage 14. Each of the first stage unit towers 16 is illustrated as being of the unitary stacked type having an upper cold section designated CT and a hot lower section, designated HT. The practice of the present invention is not dependent on the use of unitary stacked towers.

The units of the so-called "original" first stage 11 receive raw feed water at header 20, which water passes through both the hot and the cold towers of each unit and passes out as effluent at 22. Hydrogen sulfide ($H_2S$) gas circulates upwardly through the towers of each unit, entering from header 24, leaving at header 26 and returning by way of pipe 28. Enrichment from each unit of stage 11 passes to second stage 14 in the form of highly humidified hot gas leaving the hot towers HT to enter the collector 30. Cold gas depleted of isotope returns to the bottom of the respective unit cold towers of stage 11 by way of the gas return header 32. The phantom water circulation line 35 diagrammatically represents the unmodified original second stage 14 water return line which provided a virtually closed liquid flow path, internally downwardly through the towers 17 and externally upward through the line 35 from the bottom of the hot tower to the top of the cold tower.

The "supplementary" first stage 12 comprises three towers 16' substantially the same as the unit towers 16 of the original stage 11. Raw feed water enters from header 20 to the top of the cold towers CT 16' and passes downwardly through the hot towers HT to the effluent collector 38. A portion of the water is extracted at the bottom of the cold towers, in an isotope enriched condition, to enter collector 40 for passage to the second stage 14 cold tower CT (17). This enriched water passes downwardly through both cold and hot portions of second stage tower 17 and returns in depleted condition by way of header 42 to the respective hot tower liquid inlets at 43.

The first stage 12 is provided with a substantially closed gas circulation, the gas passing upwardly through both hot and cold towers to the gas collector 46, passing by return line 47 to the hot tower bottom inlet header 48 for recirculation upwardly through the towers.

In order to permit isolation of individual tower units basic flow control valves are illustrated, comprising water inlet control valves 52, 54 and 56 and water outlet control valves 71, 73, and 75 for the original first stage 11; together with gas inlet valves 70, 72, 74 and gas outlet valves 51, 53, 55 for the original first stage. In the added first stage 12 the water inlet control valves comprise valves 60, 61 and 62; the water outlet valves comprise valves 64, 65 and 66; the gas circulation control valve is shown as valve 63. Individual gas inlet and outlet valves would probably be provided, but are not identified herein. In the case of the second stage 14 the original water inlet control valve 57 and outlet control valve 69 relate to the water recirculation line 35. The water feed line 40 and water return line 42 connecting the supplementary first stage 12 with the second stage tower 14 are provided with shut-off valves 59 and 67 respectively. The gas inlet has a shut-off valve 68 and the outlet has a gas shut-off valve 58. Operation of the valves in a fashion evident to one skilled in the art permits isolation of units of the plant as required.

In the matter of plant maintenance it will be seen with the provision of two types of first stage section that the probability of the need for simultaneous first stage maintenance is reduced considerably, so that plant utilization is accordingly enhanced. The original arrangement of a plant having three first stage parallel sections is based in part on the need to provide first stage down-time capability without substantial interference in the operation of the plant as a whole.

It is contemplated that by utilizing one of the original towers together with one added tower to form the supplementary first stage section that plant expansion can be achieved at minimal cost, while maintaining to a high degree the reliability in back-up operation provided by the previously redundant tower, owing to the adoption of two different modes of enrichment transportation.

The provision of substantially balanced degrees of enrichment through the cascaded gas and the cascaded water will enhance plant in achieving mid-point enrichment balance in the respective hot and cold towers of the second stage, by the attainment of operational symmetry.

Thus original operation in an unbalanced input condition wherein the isotope enrichment enters the second stage from one end only can be redressed by the present invention, to achieve substantially balanced symmetrical operation wherein the flow equivalent to the enriched gas feed is matched by substantially the same quantity of enrichment in the form of enriched water from the added first stage capacity.

It will be evident to one skilled in the art that supplementary utlization may be obtained of the stage 12 circulation water as a heat transfer medium. All details of supplementary feeds and heat exchange arrangements have been omitted for purposes of clarity, the arrangement being susceptible of a variety of arrangements.

Also in the illustrated embodiment a certain number of control valves have been shown for purposes of simplicity, and to illustrate the capability of isolating certain of the units primarily for purposes of maintenance it being expected of one skilled in the art to be able to provide appropriate controls.

Particular advantages are afforded by the present invention due to the reduced cost involved in extending the tower capacity of the first stage while increasing the utilization of the second stage. The arrangement permits plant expansion with a minimum of disruption to production, which is of major importance in view of the high original capital costs involved and the present shortage of heavy water.

What I claim as new and desire to secure by Letters Patent of the United States is:

1. The method of operating a multi-stage deuterium isotope enrichment plant to obtain water product enriched in deuterium, the plant having hydrogen sulfide gas and water passing in counter-flow isotopic exchange through a plurality of units, each said unit having a hot zone portion and a cold zone portion units, the plant including a first stage set of units and at least one second stage unit having an output of deuterium enriched water, including the steps of; producing only gaseous fluid, containing isotope enriched gas in a plurality of said first stage set of units arranged in mutual parallel flow relation and having an original output flow capacity of deuterium enriched gas matched to the capacity of said second stage when operating in an unbalanced input condition; passing said gaseous fluid from adjacent the top of said first stage hot zone portions to the bottom of said second stage hot zone portions in cascade flow relation with the second stage; producing isotope enriched water having an initial enrichment in at least one additional first stage unit having an output flow of enriched water in a range up to a flow-equivalent to the isotopic content of said gas flow; connecting said additional first stage unit in liquid circulating relation only with said second stage from adjacent the bottom of said additional first stage cold zone portion to the top of said second stage cold zone portion to pass initially enriched water in cascade flow relation to the second stage to effectively increase the input of deuterium enrichment passing thereto, and to enhance enrichment balance and operational symmetry within said second stage whereby an improved utilization of said second stage is achieved and plant total output of enriched water product is effectively increased in relation to the flow capacity of the plant second stage.

2. The method of operating a plant as claimed in claim 1 to sustain operation at partial capacity, including closing down a portion of one said group of first stage units by terminating circulation of said gas and water in said group portion and isolating therefrom the remaining portion of the group, while maintaining operation of units of said second group.

3. The method as claimed in claim 1 wherein water at least partially stripped of deuterium content is passed from the bottom of said hot zone portion of said second stage in return flow relation to the top of said hot zone portion of said additional first stage unit.

4. An isotope enrichment plant, comprising: an original first multi-unit stage having a first group of towers, each unit of the stage having a hot tower portion and a cold tower portion, means to pass water and hydrogen sulphide gas in counter-flow deuterium exchanging relation therein, a second stage having a hot tower portion and a cold tower portion said cold tower portion including a cold water inlet; flow conducting means connecting adjacent the top of said first stage hot tower portions with the bottom of said second stage hot tower portion to connect said second stage solely in gaseous fluid receiving relation with said first stage towers and through which connection gaseous fluid enriched in deuterium content is passed to the second stage, the output capacity of said original first stage being balanced with the input capacity of said second stage when operating in an unbalanced input condition; and an additional first stage comprising at least one unit having a hot tower portion and a cold tower portion, means to pass water and hydrogen sulphide in counter-flow deuterium exchanging relation therein, said additional cold tower portion being connected at the water outlet thereof to said second stage solely by water pipes in liquid supplying relation with the cold water inlet of said second stage and through which connection water initially enriched in deuterium content is passed to the second stage for counterflow isotope exchange relation with said gaseous fluid, the output capacity of said additional first stage having a value up to the output capacity of said first group whereby the total quantity of isotope entering the second stage may be increased to the extent even that it is substantially doubled and the production of heavy water therefrom is substantially optimized.

5. The isotope enrichment plant according to claim 4 having isolating valve connecting with said first group of towers to control the passage of fluids through each said unit, including a plurality of first water valve means to close off feed water from entering the top of each of said first group cold tower portions; a plurality of second water valve means to close off the flow of hot isotope-depleted liquid from adjacent the bottom of each of said first group of hot tower portions; a plurality of first gas valve means to close off the gas inlet to each of said first group of hot tower portions and a plurality of second gas valve means to close off the gas outlet from each of said first group of cold tower portions, said valve means permitting the closing off and isolation of a portion of said first group of towers, and the maintenance of operation of at least one remaining tower of the group.

* * * * *

UNITED STATES PATENT AND TRADEMARK OFFICE
CERTIFICATE OF CORRECTION

PATENT NO. : 4,035,475
DATED : July 12, 1977
INVENTOR(S) : Reginald D. Richardson It is certified that error appears in the above—identified patent and that said Letters Patent are hereby corrected as shown below:

Assignee should read:

ATOMIC ENERGY OF CANADA LIMITED

Ottawa, Ontario, Canada

Signed and Sealed this

Sixth Day of December 1977

[SEAL]

Attest:

RUTH C. MASON
*Attesting Officer*

LUTRELLE F. PARKER
*Acting Commissioner of Patents and Trademarks*